(12) United States Patent
Grebenev

(10) Patent No.: US 7,703,139 B2
(45) Date of Patent: Apr. 20, 2010

(54) ANTIVIRUS PRODUCT USING IN-KERNAL CACHE OF FILE STATE

(75) Inventor: Dmitry Grebenev, East Setauket, NY (US)

(73) Assignee: Computer Associates Think, Inc., Islandia, NY (US)

( * ) Notice: Subject to any disclaimer, the term of this patent is extended or adjusted under 35 U.S.C. 154(b) by 1061 days.

(21) Appl. No.: 11/132,609

(22) Filed: May 18, 2005

(65) Prior Publication Data

US 2005/0262160 A1    Nov. 24, 2005

Related U.S. Application Data

(60) Provisional application No. 60/572,517, filed on May 19, 2004.

(51) Int. Cl.
*G06F 21/00* (2006.01)

(52) U.S. Cl. ...................................................... 726/24

(58) Field of Classification Search .............. 726/22–25
See application file for complete search history.

(56) References Cited

U.S. PATENT DOCUMENTS

| | | | |
|---|---|---|---|
| 5,473,769 A | 12/1995 | Cozza | 395/183.15 |
| 5,502,815 A | 3/1996 | Cozza | 395/183.14 |
| 5,649,095 A | 7/1997 | Cozza | 395/183.15 |
| 6,275,937 B1 | 8/2001 | Hailpern et al. | 713/188 |
| 7,069,594 B1 * | 6/2006 | Bolin | 726/26 |
| 7,107,617 B2 * | 9/2006 | Hursey et al. | 726/22 |
| 2001/0020272 A1 | 9/2001 | Le Pennec et al. | 713/200 |

FOREIGN PATENT DOCUMENTS

WO    WO 03/012644    2/2009

OTHER PUBLICATIONS

Notification of Transmittal of The International Search Report for Application No. PCT/US2005/017449, 7 pages, Jan. 12, 2006.
Written Opinion of the International Searching Authority for Application No. PCT/US2005/017449, 5 pages, Jan. 12, 2006.
EPO Communication pursuant to Article 94(3) EPC; Application No. 05 749 520.2-2212; Ref. HD/J00049166EP, 4 pages, May 5, 2009.

* cited by examiner

*Primary Examiner*—Gilberto Barron, Jr.
*Assistant Examiner*—Simon Kanaan
(74) *Attorney, Agent, or Firm*—Baker Botts L.L.P.

(57) ABSTRACT

A method for suppressing the generation of an event includes checking an in-kernel cache to determine if data relating to a file is within the in-kernel cache. Determining whether the file has been modified since a last time an event was generated for the file where data relating to a particular file is found to be within the in-kernel cache. Suppressing the generation of an event for the file where it is determined that the file has not been modified since the last time an event was generated for the file.

20 Claims, 3 Drawing Sheets

ANTIVIRUS PRODUCT USING IN-KERNAL CACHE OF FILE STATE

REFERENCE TO RELATED APPLICATION

The present application is based on and claims the benefit of Provisional Application Ser. No. 60/572,517, filed May 19, 2004, the entire contents of which are herein incorporated by reference.

BACKGROUND

1. Technical Field

This application relates generally to antivirus products, and particularly to improving antivirus product performance using in-kernel cache of file states.

2. Description of the Related Art

Many anti-virus products include a kernel-level component that intercepts an attempt to access a file and passes information about that attempt as an event to a user-space component that makes a decision whether the file has to be scanned for viruses. Processing an event is an expensive operation that involves multiple context switches. For example, a substantial latency exists between the time file access is identified and the time the operation is allowed to proceed.

In the traditional approach, events for a file will be generated even when that file has been previously scanned and it is known to be safe to let the operation proceed. The latency experienced when processing an event may be multiplied owing to the fact that a single file may have linked libraries that may also generate events when the single file is processed. For example, even for a simple program that works with one file, there may be multiple hidden events generated for each of the libraries with which the executable is linked.

SUMMARY

A method for suppressing the generation of an event includes checking an in-kernel cache to determine if data relating to a file is within the in-kernel cache. Determining whether the file has been modified since the last time an event was generated for the file where data relating to the file is found to be within the in-kernel cache. Suppressing the generation of an event for the file where it is determined that the file has not been modified since the last time an event was generated for the file.

A method for invoking an antivirus daemon includes intercepting a request to access a file, using an in-kernel cache to determine whether to generate an event and invoking the antivirus daemon when an event is generated.

A system for checking a file for a virus includes a kernel module for intercepting a request to access the file. An in-kernel cache is used by the kernel module for determining whether to generate an event. A daemon is used for checking the file for a virus when the kernel module determines to generate an event.

A computer system includes a processor and a computer recording medium including computer executable code executable by the processor for suppressing the generation of an event. The computer executable code includes code for checking an in-kernel cache to determine if data relating to a file is within the in-kernel cache, code for determining whether the file has been modified since a last time an event was generated for the file where data relating to the file is found to be within the in-kernel cache, and code for suppressing the generation of an event for the file where it is determined that the file has not been modified since the last time an event was generated for the file.

A computer system includes a processor and a computer recording medium including computer executable code executable by the processor for invoking an antivirus daemon. The computer executable code includes code for intercepting a request to access a file, code for using an in-kernel cache to determine whether to generate an event and code for invoking the antivirus daemon when an event is generated.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
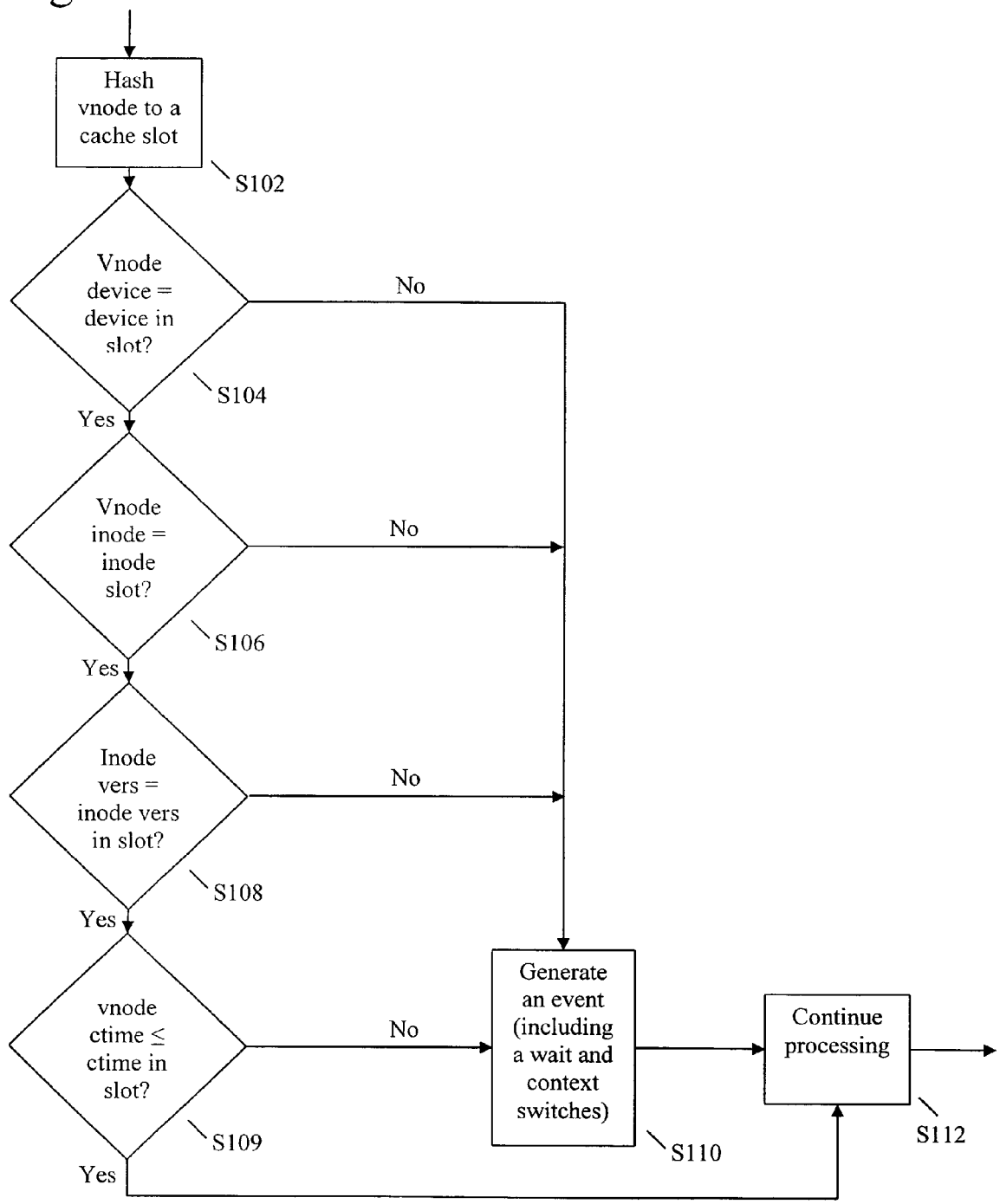
FIG. 1 is a flow diagram illustrating the method in one embodiment.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Most Unix and Unix-like operating systems like Linux provide the stat and fstat API as per SVR4, POSIX, SVID standards that allows retrieval of ctime (change time) among other information about a file. For a disk-based filesystem, that information is maintained by the filesystem in an on-disk object called inode. Some information in the inode can be directly or indirectly affected by a program, e.g., changing timestamps via a utime system call or changing file size as a result of the truncate call. The ctime field is different however from the other fields and timestamps in the inode in that it is modified exclusively by the filesystem every time any field in the inode itself changes. Thus, it is possible to use ctime of a file as an indicator of when that file has changed and suppress a file access event unless the file did change and has to be rescanned.

Embodiments of the present disclosure may delete events for frequently used files that have not changed since the last time an event was generated on them to enhance the efficiency of an antivirus application that is event driven. Such antivirus applications may rely on the fact that the inode modification time (ctime) is manipulated by the kernel-level file system code, and it is not possible to modify the file and its properties from user-space application (as a virus would do) without causing modification of its inode's ctime.

Further features as well as the structure and operation of various embodiments are described in detail below with reference to the accompanying drawings. In the drawings, like reference numbers indicate identical or functionally similar elements.

According to an embodiment of the present disclosure, a system and method are provided that may maintain an in-kernel cache of file data and may check the cache before an event processing is performed. If the data for a particular file is found in the cache, it may be verified whether the file has been modified since the last time an event for it was generated. If it was not modified, then an event can be suppressed. A vnode pointer may be used as a key to find file data in the cache. Vnode is an object that internally describes a file in the UNIX kernel, and the UNIX kernel manipulates that object via a pointer to it. Vnode object is persistent for the lifetime of a file, that is, it can be reused (for a different file) only when there are no more references to the file. Vnodes can be reused and multiple vnodes can hash into the same cache memory slot. Additional checks may be made to make sure that data available in the cache is for the file in question.

FIG. 1 is a flow diagram illustrating a method according to an embodiment of the present disclosure. A vnode pointer may be hashed into a cache slot (Step S102). An index into the cache may be obtained. To make sure that the right file is referenced, several checks should be made. For example, the vnode can be checked to determine if the file device is the device in the cache slot (Step S104). The vnode can be checked to determine if the inode is the inode in the cache slot (Step S106). The inode can be checked to determine if the inode version is the inode version in the cache slot (Step S108) (in case inode was reused for a different file). If all these checks were successful (Yes, Steps S104, S106 and S108), it is determined that there is an entry for the file in question in cache. The system then retrieves the ctime for that file from the cache and vnode. If the ctime for the entry in the cache is the same as in the vnode (Yes, Step S109), then the file has not changed since the time it was added to the cache and no event need be generated for that file. Regardless of whether an event was generated, vnode data in the cache may be updated at Step S112 and the rest of processing may take place. If any of these checks were not successful (No, Steps S104, S106, S108 or S109) then an event should be generated (Step S110) prior to continuing processing (Step S112).

Figure 2:
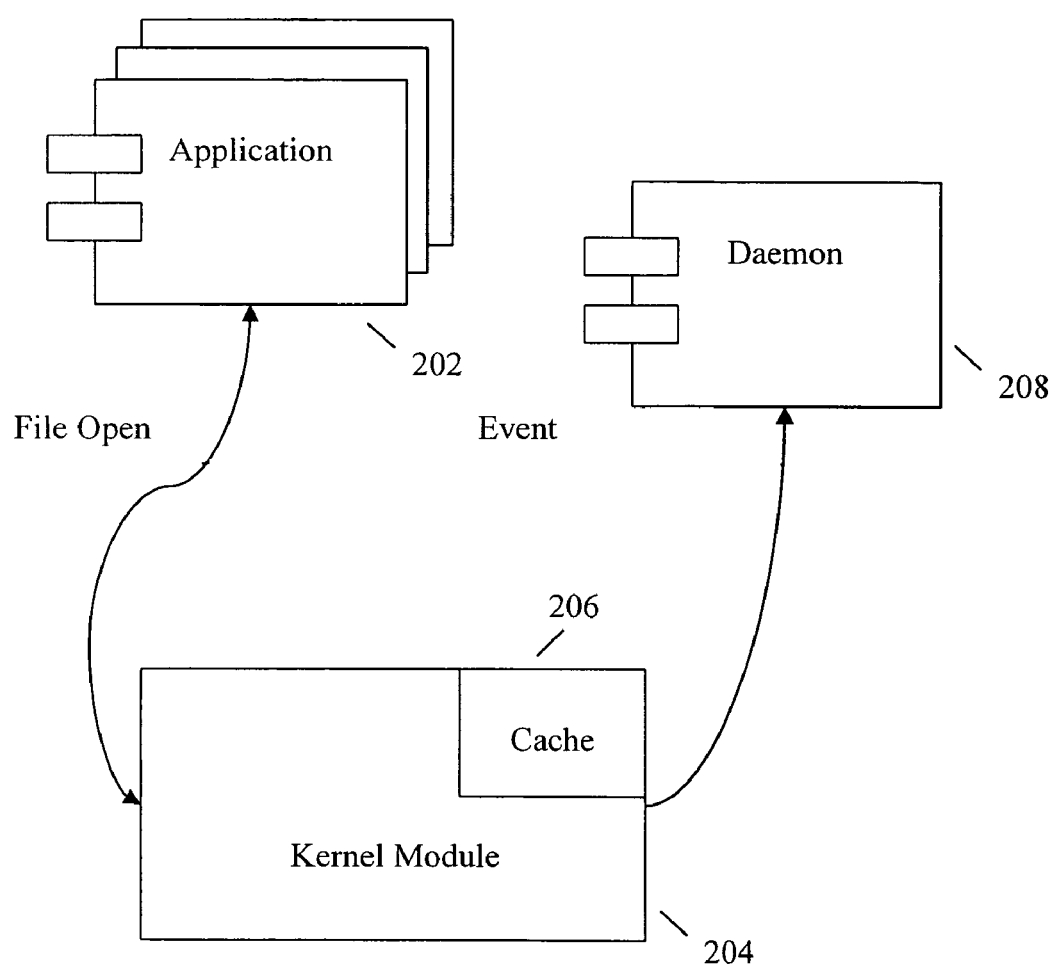
FIG. 2 illustrates the conceptual arrangement of components in one embodiment of the present disclosure.
Figure 3:
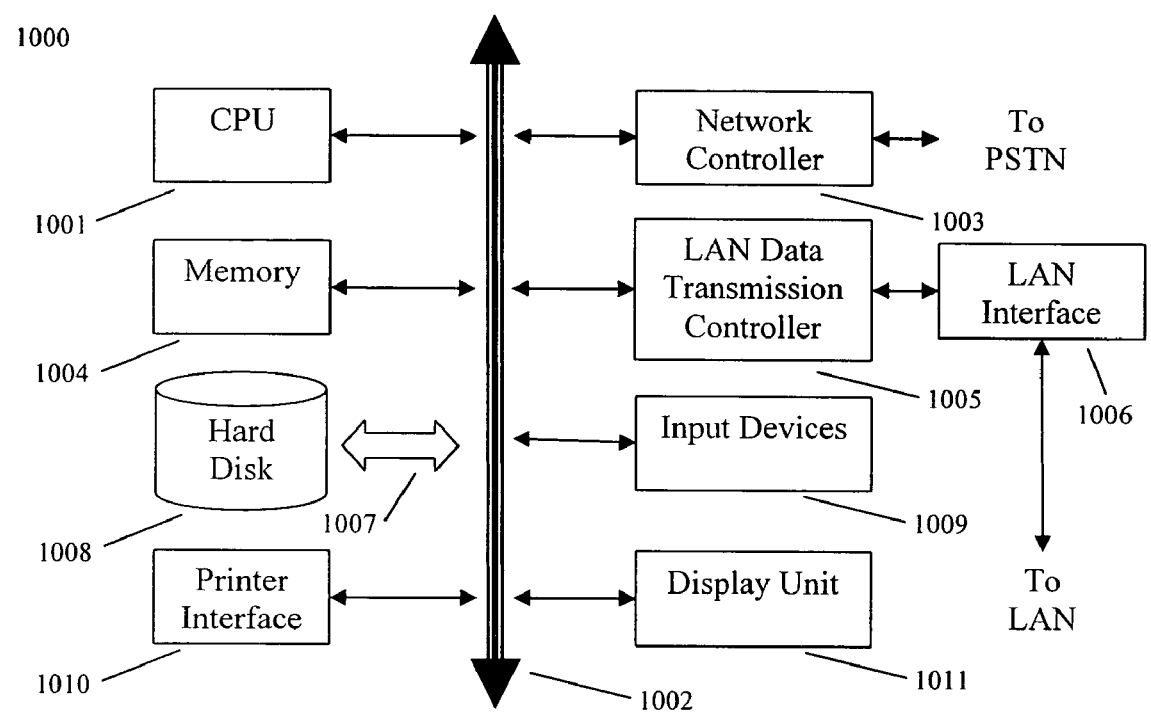
FIG. 3 shows an example of a computer system capable of implementing the method and apparatus according to embodiments of the present disclosure.

FIG. 2 illustrates a conceptual arrangement of components according to an embodiment of the present disclosure. An application 202 may access a file. The kernel module 204 may intercept that access and using its cache 206 decide whether to generate an event for the user-space daemon 208. If an event is generated, in-kernel processing resumes upon reply from the daemon. If event is not generated, in-kernel processing proceeds directly. Application 202 gets access to the file. The extra processing is transparent to the application 202.

Different cache implementations can be used to implement the system and methods described in embodiments of the present disclosure. For example, chain, bucket or other known cache methods can be used. Further, the cache can be fixed in size or dynamic. Different caches may be used to populate with entries for file of a particular type such as read-only files, etc.

The system and method of the present disclosure may be implemented and run on a general-purpose computer. The embodiments described above are illustrative examples and it should not be construed that the present disclosure is limited to these particular embodiments. Thus, various changes and modifications may be effected by one skilled in the art without departing from the spirit or scope of the disclosure as defined in the appended claims.

FIG. 4 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for suppressing the generation of an event, comprising:

maintaining data in an in-kernel cache that identifies the occurrence of a first event associated with a modification to a file;

prior to the generation of a second event for the file, checking the in-kernel cache to determine if data relating to the file is within the in-kernel cache;

prior to the generation of a second event for the file, using an in-kernel component to determine that the file has not been modified since the first event was generated for the file; and using the in-kernel component to suppress the generation of the second event for the file in response to determining that the file has not been modified since the first event was generated for the file, the suppression of the generation of the second event preventing receipt of the second event by a user-space daemon, wherein determining that the file has not been modified since the first event was generated for the file comprises:

comparing a ctime for the file from the in-kernel cache with data in a vnode; and determining that the ctime for the file from the in-kernel cache is the same as the data in the vnode.

2. The method of claim 1, wherein the step of checking the in-kernel cache to determine if data relating to the file is within the in-kernel cache comprises determining whether a vnode device for the file is within the in-kernel cache.

3. The method of claim 1, wherein the step of checking the in-kernel cache to determine if data relating to the file is within the in-kernel cache comprises determining whether an mode for the file is within the in-kernel cache.

4. The method of claim 1, wherein the step of checking the in-kernel cache to determine if data relating to the file is within the in-kernel cache comprises determining whether an mode version for the file is within the in-kernel cache.

5. The method of claim 1, wherein determining that the file has not been modified since the first event was generated for the file comprises:

retrieving a first ctime for the file from the in-kernel cache;

retrieving the second ctime for the file from a vnode; and comparing the first ctime from the in-kernel cache to the second ctime from the vnode, wherein the file has not been modified since the first event if the first ctime from the in-kernel cache is the same as the second ctime from the vnode.

6. A method for invoking an antivirus daemon, comprising:
maintaining data in an in-kernel cache that identifies the occurrence of a first event associated with a modification to a file;
using an in-kernel component to intercept a request to access the file;
prior to the generation of a second event for the file, using the in-kernel component to search the in-kernel cache to determine whether to generate the second event based on whether the file has been modified since the first event was generated for the file; and
invoking a user-space antivirus daemon to generate the second event where it is determined that the file has been modified since the first event was generated for the file; and
using the in-kernel component to suppress the generation of the second event for the file where it is determined that the file has not been modified since the first event was generated for the file, the suppression of the generation of the second event preventing receipt of the second event by the user-space antivirus daemon,
wherein using the in-kernel cache to determine whether to generate the second event comprises:
comparing a ctime for the file from the in-kernel cache with data in a vnode, and
determining that the file has not been modified if the first ctime from the in-kernel cache is the same as the second ctime from the vnode, and
determining that the file has been modified if the first ctime from the in-kernel cache is different from the second ctime from the vnode.

7. The method of claim 6, further comprising initiating an antivirus program for the file when the second event is generated for the file.

8. The method of claim 6, wherein using the in-kernel cache to determine whether to generate an event comprises:
prior to the generation of the second event for the file, checking the in-kernel cache to determine if data relating to the file is within the in-kernel cache; and
prior to the generation of the second event for the file, determining that the file has been modified since the first event was generated for the file where data relating to the file is found to be within the in-kernel cache.

9. The method of claim 8, wherein the step of checking the in-kernel cache to determine if data relating to the file is within the in-kernel cache comprises determining whether a vnode device for the file is within the in-kernel cache.

10. The method of claim 8, wherein the step of checking the in-kernel cache to determine of data relating to the file is within the in-kernel cache comprises determining whether an mode for the file is within the in-kernel cache.

11. The method of claim 8, wherein the step of checking the in-kernel cache to determine if data relating to the file is within the in-kernel cache comprises determining whether an mode version for the file is within the in-kernel cache.

12. The method of claim 6, wherein using the in-kernel cache to determine whether to generate the second event comprises:
retrieving a first ctime for the file from the in-kernel cache;
retrieving a second ctime for the file from a vnode; and
comparing the first ctime from the in-kernel cache to the second ctime from the vnode,
wherein the file has not been modified since the first event if the first ctime from the in-kernel cache is the same as the second ctime from the vnode, and
wherein the file has been modified since the first event if the first ctime from the in-kernel cache is different from the second ctime from the vnode.

13. A system for checking a file for a virus, comprising:
a kernel module executed by a processor, the kernel module for:
maintaining data in an in-kernel cache that identifies the occurrence of a first event associated with a modification to a file,
intercepting a request to access the file
prior to the generation of a second event for the file, determining whether to generate the second event based on whether the file has been modified since the first event was generated for the file, wherein determining whether the file has been modified since the first event was generated for the file comprises:
comparing a ctime for the file from the in-kernel cache with data in a vnode; and
determining that the ctime for the file from the in-kernel cache does not match data in the vnode,
suppressing the generation of the second event for the file where it is determined that the file has not been modified since the first event was generated for the file; and
a user-space antivirus daemon executed by the processor, for checking the file for a virus where it is determined that the file has not been modified since the first event was generated for the file, the suppression of the generation of the second event by the kernel module preventing receipt of the second event by the user-space antivirus daemon.

14. The system of claim 13, wherein:
prior to the generation of the second event for the file, the in-kernel cache is checked to determine if data relating to the file is within the in-kernel cache;
prior to the generation of the second event for the file, it is determined that the file has been modified since the first event was generated for the file where data relating to the file is found to be within the in-kernel cache.

15. A computer system comprising:
a processor; and
a computer recording medium including computer executable code executable by the processor for suppressing the generation of an event, the computer executable code comprising:
code for maintaining data in an in-kernel cache that identifies the occurrence of a first event associated with a modification to a file;
code for using an in-kernel component to check the in-kernel cache, prior to the generation of a second event for the file, to determine if data relating to the file is within the in-kernel cache;
code for using the in-kernel component to determine, prior to the generation of the second event for the file, whether the file has been modified since the first event was generated for the file where data relating to the file is found to be within the in-kernel cache, wherein determining whether the file has been modified since the first event was generated for the file comprises:
comparing a ctime for the file from the in-kernel cache with data in a vnode;
determining that the file has not been modified if the first ctime from the in-kernel cache is the same as the second ctime from the vnode; and
determining that the file has been modified if the first ctime from the in-kernel cache is different from the second ctime from the vnode;

code for using the in-kernel component to suppress the generation of the second event for the file where it is determined that the file has not been modified since the first event was generated for the file, the suppression of the generation of the second event preventing receipt of the event by a user-space antivirus daemon.

16. The computer system of claim 15, wherein the code for checking the in-kernel cache to determine if data relating to the file is within the in-kernel cache comprises code for determining whether a vnode device for the file is within the in-kernel cache.

17. The computer system of claim 15, wherein the code for checking the in-kernel cache to determine if data relating to the file is within the in-kernel cache comprises code for determining whether an mode for the file is within the in-kernel cache.

18. The computer system of claim 15, wherein the code for checking the in-kernel cache to determine if data relating to the file is within the in-kernel cache comprises code for determining whether an mode version for the file is within the in-kernel cache.

19. A computer system comprising:
a processor; and
a computer recording medium including computer executable code executable by the processor for invoking an antivirus daemon the computer executable code comprising:
code for maintaining data in an in-kernel cache that identifies the occurrence of a first event associated with a modification to a file;
code for intercepting a request to access a file prior to the generation of a second event for the file;
code for using an in-kernel component to search the in-kernel cache, prior to the generation of the second event for the file, to determine whether to generate the second event, wherein using the in-kernel cache to determine whether to generate the second event comprises:
comparing a ctime for the file from the in-kernel cache with data in a vnode; and
determining that the file has not been modified if the first ctime from the in-kernel cache is the same as the second ctime from the vnode; and
determining that the file has been modified if the first ctime from the in-kernel cache is different from the second ctime from the vnode;
code for using the in-kernel component to suppress the generation of the second event for the file where it is determined that the file has not been modified since the first event was generated for the file, the suppression of the generation of the second event preventing receipt of the second event by a user-space antivirus daemon; and
code for invoking the user-space antivirus daemon to generate the second event where it is determined that the file has been modified since the first event was generated for the file.

20. The computer system of claim 19, wherein the code for using the in-kernel cache to determine whether to generate the second event comprises:
code for checking the in-kernel cache, prior to the generation of the second event for the file, to determine if data relating to the file is within the in-kernel cache;
code for determining, prior to the generation of the second event for the file, that the file has been modified since the first event was generated for the file where data relating to the file is found to be within the in-kernel cache.

* * * * *